(12) United States Patent
Zimmer et al.

(10) Patent No.: US 7,739,193 B2
(45) Date of Patent: Jun. 15, 2010

(54) PAYING MULTIPLE PAYEES THROUGH INTEGRATION OF A THIRD-PARTY ON-LINE PAYMENT SYSTEM WITH AN ENTERPRISE INFORMATION TECHNOLOGY SYSTEM

(75) Inventors: Robert Zimmer, Saarbruecken (DE); Joachim Sander, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/616,792

(22) Filed: Dec. 27, 2006

(65) Prior Publication Data

US 2008/0162341 A1 Jul. 3, 2008

(51) Int. Cl.
*G06Q 40/00* (2006.01)
(52) U.S. Cl. .......................................................... 705/40
(58) Field of Classification Search .................... 705/35, 705/39–44, 64, 74–79; 725/5; 709/201–203
See application file for complete search history.

(56) References Cited

U.S. PATENT DOCUMENTS

| | | | |
|---|---|---|---|
| 5,220,501 | A | 6/1993 | Lawlor |
| 5,283,829 | A | 2/1994 | Anderson |
| 5,383,113 | A | 1/1995 | Kight |
| 5,465,206 | A | 11/1995 | Hilt |
| 5,649,117 | A | 7/1997 | Landry |
| 5,677,955 | A | 10/1997 | Doggett et al. |
| 5,729,584 | A | 3/1998 | Klingman |
| 5,903,881 | A | 5/1999 | Schrader |
| 5,956,700 | A | 9/1999 | Landry |
| 6,044,362 | A | 3/2000 | Neely |
| 6,070,150 | A | 5/2000 | Remington |
| 6,222,536 | B1 | 4/2001 | Kihl |
| 6,996,542 | B1 | 2/2006 | Landry |
| 7,280,981 | B2 | 10/2007 | Huang et al. |
| 2001/0032182 | A1* | 10/2001 | Kumar et al. ............. 705/40 |
| 2001/0032183 | A1 | 10/2001 | Landry |
| 2002/0016769 | A1 | 2/2002 | Barbara et al. |
| 2002/0023055 | A1 | 2/2002 | Antognini et al. |
| 2002/0032653 | A1 | 3/2002 | Schutzer |
| 2002/0143566 | A1 | 10/2002 | Diveley |
| 2004/0117302 | A1* | 6/2004 | Weichert et al. .......... 705/40 |

(Continued)

OTHER PUBLICATIONS

Kuttner et al., "Personal On-line Payments", Economic Policy Review—Federal Reserve Bank of New York, v7n3, pp. 35-50, Dec. 2001.*

(Continued)

*Primary Examiner*—Mary Cheung
(74) *Attorney, Agent, or Firm*—Fish & Richardson P.C.

(57) ABSTRACT

Techniques for displaying a graphical user interface operable to receive user input specifying payments to be made are described. Each payment identifies a payee and a payment method to be used to make the payment. The techniques include making a determination as to whether any of the specified payments involve a payment method that uses a third-party on-line payment system. In response to a determination that a specified payment involves a payment method that uses a third-party on-line payment system, a message is sent to the third-party on-line payment system. The message includes payment information for specified payments to be paid by the third-party on-line payment system such that the third-party on-line payment system is able to process the specified payments.

21 Claims, 7 Drawing Sheets

U.S. PATENT DOCUMENTS

| | | | |
|---|---|---|---|
| 2004/0139008 A1* | 7/2004 | Mascavage, III | 705/40 |
| 2004/0148252 A1* | 7/2004 | Fleishman | 705/39 |
| 2006/0080243 A1 | 4/2006 | Kemper | |
| 2006/0212392 A1* | 9/2006 | Brown | 705/40 |
| 2006/0229985 A1* | 10/2006 | Lalwani et al. | 705/41 |
| 2007/0136191 A1 | 6/2007 | Itwaru | |

OTHER PUBLICATIONS

Daniel C. Lynch, Digital Money, Chapter Two, Dramatis Personae, pp. 23-39, John Wiley and Sons (1996).

Epper, Karen, Checkfree to test on-line payment with utility companies in 3 states, American Banker, vol. 160, No. 218, p. 14 (Nov. 10, 1995).

"PayPal Integration Center, Resources and Support," available at http://www.paypal.com/IntegrationCenter/ic_home.html (last visited Dec. 26, 2006).

Office Action for U.S. Appl. No. 11/616,767, mailed Dec. 9, 2008.

Office Action for U.S. Appl. No. 11/616,767, mailed Jul. 17, 2008, 10 pages.

* cited by examiner

FIG. 4B

PAYING MULTIPLE PAYEES THROUGH INTEGRATION OF A THIRD-PARTY ON-LINE PAYMENT SYSTEM WITH AN ENTERPRISE INFORMATION TECHNOLOGY SYSTEM

TECHNICAL FIELD

This description relates to the integration of enterprise information technology systems with a third-party on-line payment system.

BACKGROUND

Computer systems often are used to manage and process business data. To do so, a business enterprise may use various application programs running on one or more enterprise IT systems. Application programs may be used to process business transactions, such as taking and fulfilling customer orders, providing supply chain and inventory management, performing human resource management functions, and performing financial management functions. A computer system may include a financial transaction component that enables payment of invoices and other payable items.

SUMMARY

In one general aspect, a graphical user interface is displayed. The graphical user interface is operable to receive user input specifying payments to be made, where each payment identifies a payee and a payment method to be used to make the payment. A determination as to whether any of the specified payments involve a payment method using a third-party on-line payment system is made. In response to a determination that a specified payment involves a payment method using a third-party on-line payment system, a message is sent to the third-party on-line payment system. The message includes payment information for specified payments to be paid by the third-party on-line payment system such that the third-party on-line payment system is able to process the specified payments.

Implementations may include one or more of the following features. Data representing unpaid invoices associated with the payee may be accessed. The accessed unpaid invoice data may be displayed within the graphical user interface such that the graphical user interface is operable to receive user input specifying one or more unpaid invoices to pay from among the accessed unpaid invoice data.

The payment information may be sent through a file transfer to the third-party on-line payment system. A notification to the payor system including information associated with processing the payment to the payee system may be provided. A notification to the payee system including information associated with processing the payment to the payee system may be provided.

A user input indicating confirmation of the specified payments to be made may be received. The specified payment may include invoices associated with a payee identified in the specified payments. A user input indicating confirmation of payment of some of the unpaid invoices may be received. A graphical user interface associated with the third-party on-line payment system may be initiated.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

FIGS. 4A and 4B are illustrations of example graphical user interfaces that may be used to define a payment.

DETAILED DESCRIPTION

To fully understand the techniques presented in this description, the challenges and issues related to integrating enterprise information technology systems with a third-party on-line payment system are discussed. An enterprise information technology system may include a financial transaction component that enables payment of invoices or other payable items. Managing (e.g., paying and tracking) the payment of a large number invoices using different payment systems may require reconciliation between the different payment systems. When the different payment systems are not able to communicate or otherwise exchange financial data, the reconciliation of payments made with the different payment systems may be more challenging. Integration of the enterprise information technology system with a third-party on-line payment system may streamline the management of the payment of a large number of invoices or other payable items across different payment systems. Integration of the enterprise information technology system with a third-party on-line payment system enables a user of the enterprise technology system to pay invoices or other payable items through the third-party on-line payment system from within the enterprise information technology system. Additionally, integration may enable the user to pay invoices and other payable items through a variety of payment methods that otherwise would only be available through the use of different financial or payment systems. Moreover, the integration may enable more precise tracking of invoice payments, thus improving the enterprise's ability to maintain accurate accounting records.

Accordingly, techniques are provided for integrating an enterprise information technology system with a third-party on-line payment system.

Figure 1:
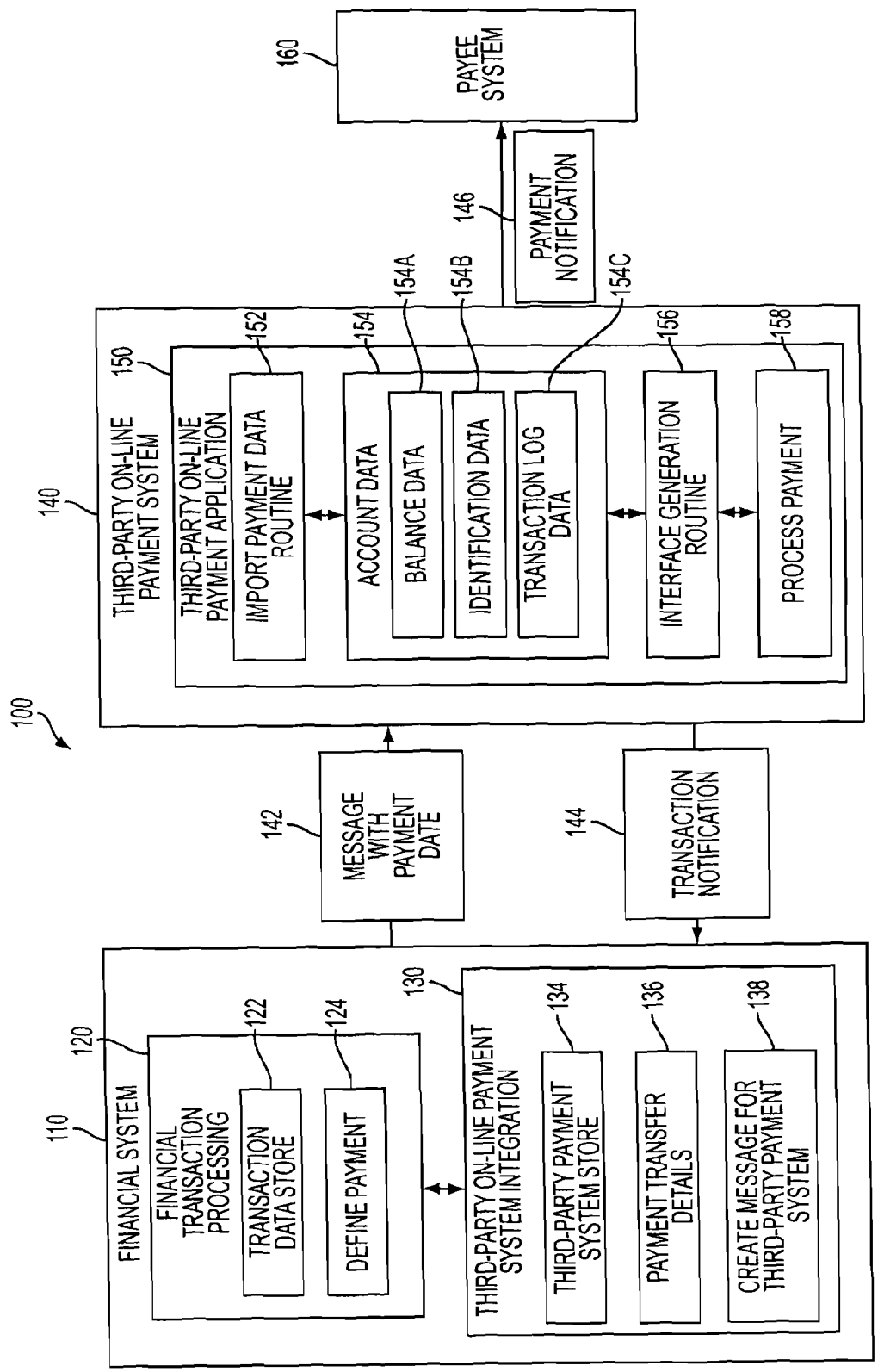
FIG. 1 is a block diagram of a network of computer systems.

A network of computer systems 100, in which a third-party on-line payment system 140 is integrated with an enterprise information technology (IT) system 110 having a financial transaction processing component 120 (collectively, "financial system 110"), is shown in FIG. 1. A third-party on-line payment system integration component ("integration component") 130 integrates a third-party on-line payment system 140 with the financial system 110 as described more fully below. In general, the integration component 130 enables a user, from within a user interface displayed by financial transaction processing component 120, to select a third-party on-line payment system 140. The user may then pay one or more payees for selected payable items through the selected third-party on-line payment system 140. The user of the financial system 110 or the enterprise operating the financial system 110 may be referred to as the payor.

The user may define a payment to be made by indicating a payee, or payees, and the method of payment. In response to the user's definition of a payment to be made and the user's selection of a third-party on-line payment system 140 to be used to make the payment, the integration component 130 creates a message 144 to be transferred from the financial system 110 to the third-party on-line payment system 140. The message 144 enables the financial system 110 to access the services provided by the third-party on-line payment system 140 to make the payment to the payee by sending a payment through the third-party on-line payment system. The message 144 generally includes information regarding a financial transaction that is included in the financial system 110 but not otherwise included in the third-party on-line payment system 140. For example, the message 144 may include information such as, for example, data identifying the payee, data indicating the amount of payment, and data identifying the currency in which to make the payment.

Integration of the financial system 110 and the third-party on-line payment system 140 may enable the payor and/or payee to receive rapid notice of a payment, which, in turn, may enable more accurate record keeping. In some implementations, the payor and/or the payee may receive notice of payment that is substantially concurrent with payment transfer of the payment itself. This may be referred to as providing payment notice substantially in real-time with making the payment. Moreover, transferring funds through the third-party on-line payment system 140 may help to minimize or, perhaps to eliminate, global transfer fees associated with some types of international fund transfers.

More particularly, the network of computer systems 100 includes the financial system 110 and the third-party on-line payment system 140. The network 100 also includes at least one payee system 160, which may be a financial system for a commercial enterprise that is to receive payment from the payor. The systems, 110, 140, and 160, each are capable of executing instructions on data, and the systems are indirectly interconnected with one another. Communication between the financial system 110 and the third-party on-line payment system 140 (as well as communication between the third-party on-line payment system 140 and the payee system 160) may be provided, for example, through a variety of established networks, such as, for example, the Internet, a Public Switched Telephone Network (PSTN), the Worldwide Web (WWW), a wide-area network ("WAN"), a local area network ("LAN"), a wired network, or a wireless network. The communication may be provided through the use of a middleware messaging system. The financial system 110 may deliver and exchange data with the third-party on-line payment system 140 through a communication gateway. For example, the message 144 may be transferred from the financial system 110 to the third-party on-line payment system 140 through a gateway. Similarly, the third-party on-line payment system 140 may deliver and exchange data with the payee system 160 through a communication gateway.

The financial system 110 includes a financial transaction processing component 120 that is used to view, modify, store, and process data related to financial transactions. In one example, the financial transaction processing component 120 may be a commercial computer application that is developed and licensed (or sold) by a commercial software developer for sale to, and use by, many business enterprises. In another example, the financial transaction processing component 120 and the integration component 130 may be part of a suite of commercial applications that are developed and licensed (or sold) by a commercial software developer.

The financial transaction processing component 120 includes a transaction data store 122. In particular, the transaction data store 122 includes information about payable items. Information about the payable items may include, for example, the number of open invoices for a particular payee, the amount owed on each open invoice, the currency in which each open invoice is to be paid, the date of any previous payment made to the payee, the current account balance owed to the payee, contact information for the payee, and information regarding the default payment method for the payee. The transaction data store 122 may be, for example, a relational database that logically organizes data into a series of database tables. Each database table arranges data in a series of columns (where each column represents an attribute of the data stored in the database) and rows (where each row represents attribute values). The transaction data store 122 may be, for example, an object-oriented database that logically or physically organizes data into a series of objects. Each object may be associated with a series of attribute values. The transaction data store 122 also may be a type of database management system that is not necessarily a relational or object-oriented database. For example, a series of XML (Extensible Mark-up Language) files or documents may be used, where each XML file or document includes attributes and attribute values.

The financial transaction processing component 120 also includes a define payment component 124. The define payment component 124 includes instructions that, when executed, enable a user of financial system 110 to define the payments to be made to the payee. The define payment component 124 also may include instructions, that when executed, for display and control a user interface that enables the user of financial system 110 to view information in the transaction data store 122. For example, executing the instructions in the define payment component 124 may result in the display of some or all of the payable items that are owed to a particular payee. In another example, executing the instructions may display all of the payable items that are owed to multiple payees. Additionally, the interface also enables the user to define the payment to be made. For example, the user may select multiple payable items owed to a particular payee as the payment to be made. In another example, the user may view payable items that are owed to more than one payee and the user may select particular payable items as the payments to be made to each of the various payees.

When executed, the instructions of the define payment component 124 also may allow the user of the financial system 110 to select a method of payment for each payment. For example, the user may select to pay the payee through a third-party on-line payment system. Examples of third-party on-line payment systems include PayPal®, available from PayPal, Incorporated of San Jose, Calif.; e-gold®, available from Gold & Silver Reserve, Incorporated of Melborne, Fla.; and NetPay®, available from Chugach Electric Association, Incorporated of Anchorage, Ak. In another example, the user may select to pay the payee through a traditional bank draft, a credit card, or an electronic transfer. In yet another example, the user may select the account from which to pay the defined payment from among multiple available accounts on a particular third-party on-line payment system 140. In still another example, the payee may be associated with a default method of payment that the user may elect to use. After the payment is defined, the define payment component 124 may persistently store the payment information in the transaction data store 122.

The integration component 130 is configured to package a portion of the financial data in the transaction data store 122 as a message 144 for transmission to the third-party on-line payment system 140. In particular, the message includes data that defines the payments to be made using the third-party on-line payment system 140. As described above with respect to the define payment component 124, this information defining the payment may be stored in transaction data store 122. The integration component 130 enables financial transaction data that is defined in the financial system 110 to be used to initiate payment to a payee using the third-party payment system 140. This allows the third-party on-line payment system 140 and the financial transaction system 110 to be used together.

The integration component 130 also includes a third-party payment system store 134 that stores identifying information about one or more third-party payment systems 140. Thus, the third-party payment system store 134 provides data that allows a user of the financial system 110 to select from among several third-party on-line payment systems. In general, the third-party payment system store 134 is configured with information for a particular third-party on-line payment system prior to a user defining a payment to be made through the particular third-party on-line payment system. In one example, the third-party payment system store 134 may be configured with information related to the enterprise's account on a particular third-party on-line payment system and information usable to initiate a payment using the particular third-party on-line payment system (e.g., a network address of the particular third-party on-line payment and payment format requirements). The information related to the enterprise's account may also include information that identifies the enterprise to a particular third-party on-line payment system, such as a username and password associated with an account on the third-party on-line payment system. Once information related to a particular third-party on-line payment system has been stored in the third-party payment system store 134 (e.g., the integration component 130 has been configured to work with the particular third-party on-line payment system), a user of financial system 110 may select to pay a payee using the particular third-party on-line payment system.

The integration component 130 also includes a payment transfer details component 136. The payment transfer details component 136 includes instructions that, when executed, allows information identifying the payee system 160 to be specified. The payment transfer details component 136 may allow the user to directly specify information that identifies the payee's account on the third-party on-line payment system 140. The user may have the option of indicating that the information identifying the payee be used for the current transaction only. Alternatively, information identifying the payee's account may be predefined and retrieved by the payment transfer details component 136 from the transaction data store 122. The information identifying the payee's account may be information that uniquely identifies the payee, such as, for example, an email address. The information identifying the payee may also correspond to an account on the third-party on-line payment system 140 that is associated with the recipient. Thus, the payee's contact information may identify the payee's account on the third-party payment system 140. Finally, the payment transfer details component 136 may also include instructions that, when executed, persistently store the information identifying the payee in the transaction data store 122.

The integration component 130 also includes instructions 138 that, when executed, create a message 144 for the third-party on-line payment system 140. The message 144 may include information defining the payment to be made as well as data required to access an account on the third-party on-line payment system 140. When executed, the instructions 138 access the information that defines the payment to be made that was created using the define payment component 124. The payment information may include, for example, information identifying the invoices to be paid to the payee, the total amount of payment to be made to a payee, the method of payment, and the currency in which the payment is to be made to the payee.

The instructions 138 also may access information from the third-party on-line payment store 134 that enables access to the enterprise's account on a particular third-party on-line payment system. For example, such information may include the username and password for the enterprise's account on the third-party on-line payment system. The instructions 138 also may access information, from the payment transfer details component 136, that identifies the payee's account on the third-party on-line payment system 140. The executable instructions 138 package the information into message 144. The financial system 110 then provides the message 144 to the third-party on-line payment system 140 such that the defined payments may be processed by the third-party on-line payment system 140.

In some implementations, the information included in message 144 may be provided to the third-party on-line payment system 140 in a Microsoft Excel® file. In these implementations execution of the instructions 138, for example, may cause a Microsoft Excel® file to be created. The financial system 110 then provides the Microsoft Excel® file to the third-party on-line payment system 140 such that the defined payments may be processed by the third-party on-line payment system 140. In another implementation, the information included in message 144 may be provided to the third-party on-line payment system 140 in an ASCII text file or an XML file.

In the example of system 100, the integration component 130 is a component of the financial system 110, though this need not necessary be so. For example, the integration component 130 may be a separate component that is interoperable with the financial system 110.

As discussed above, the third-party on-line payment system 140 can be one of multiple available on-line payment systems. For example, the third-party on-line payment system 140 may be an Internet-based on-line payment intermediary, such as PayPal®, e-gold®, or NetPay®. The third-party on-line payment system application ("third-party application") 150 includes an import payment data routine 152. The import payment data routine 152 imports the data that the financial system 110 sent to the third-party on-line payment system 140 using message 144. The third-party application 150 also includes account data 154, which includes information about the enterprise's account on the third-party on-line payment system 140. Account data 154, as shown in this example, includes balance data 154A, account-holder identification 154B, and transaction log data 154C.

In addition, the third-party application 150 includes an interface generation routine 156. The interface generation routine 156 includes instructions that, when executed, display and control an interface that enables information related to the enterprise's account on the third-party on-line payment system 140 to be presented to the user of the financial system 110. The interface may be displayed within the financial system 110, and the interface enables the user of the financial system 110 to pay the transactions that were defined using the define payment component 124. The interface also may show a summary of the payment information, such as, for example, the account from which the payment will be made, information that identifies the payment recipient, the amount of the payment, and the invoice numbers of the individual payments. Display of this information enables the user to confirm that the information related to the payment to be made is correct before the third-party application 150 processes the payment. The interface also may allow the user to access other functionality of the third-party on-line payment system 140. For example, the interface may enable the user to view the transaction log for their account.

The third-party application 150 also includes payment processing instructions 158. When executed, the payment processing instructions 158 process a particular defined payment such that funds may be transferred from the enterprise's account to the payee's account. Additionally, when executed, the payment processing instructions 158 determine whether the enterprise's account includes sufficient funds to make the defined payments. If there are insufficient funds in the account, the payment processing instructions 158 may ask the user to specify another account from which to make the payment.

Once it is determined that the enterprise's account has sufficient funds to make the defined payment, execution of the payment processing instructions 158 causes the third-party on-line payment system 140 to send a transaction notification 144 to the financial system 110. The transaction notification 144 includes information related to the payment, such as, for example, information identifying the payee, an indication of whether the transaction was processed successfully, a time stamp indicating the time the payment was processed, the amount of the payment processed, the currency in which the payment was made, the payment method, and the payee's contact information. The transaction notification 144 also may include information that allows the financial system 110 to track the payment. For example, the transaction notification 144 may include information, such as invoice numbers, to identify which payable items were paid. The financial system 110 may persistently store the information contained in the transaction notification 144 in the transaction data store 122.

Additionally, if the payee and the payor both have an account on the same third-party on-line payment system 140, the third-party on-line payment system 140 may transfer the funds to the payee as soon as the payment is processed by the payment processing component 158. In this case, the transaction notification message 144 may also include an indication that the finds have been transferred to the payee.

In addition, execution of the payment processing instructions 158 also causes a payment notification 146 to be sent to the payee system 160. Similar to the transaction notification 144, the payment notification 146 informs the payee system 160 that a payment has been made. Additionally, if the payee has an account on the same third-party on-line payment system 140 as the payor, the payment notification 146 may include an indication that finds have been placed in the payee's account on the third-party on-line payment system 140. If the user of financial system 110 specified payments to multiple payees, the third-party on-line payment system 140 may be able to send a payment notification 146 to each payee system 160 and the transaction notification 144 will indicate that multiple transactions occurred.

Figure 2:
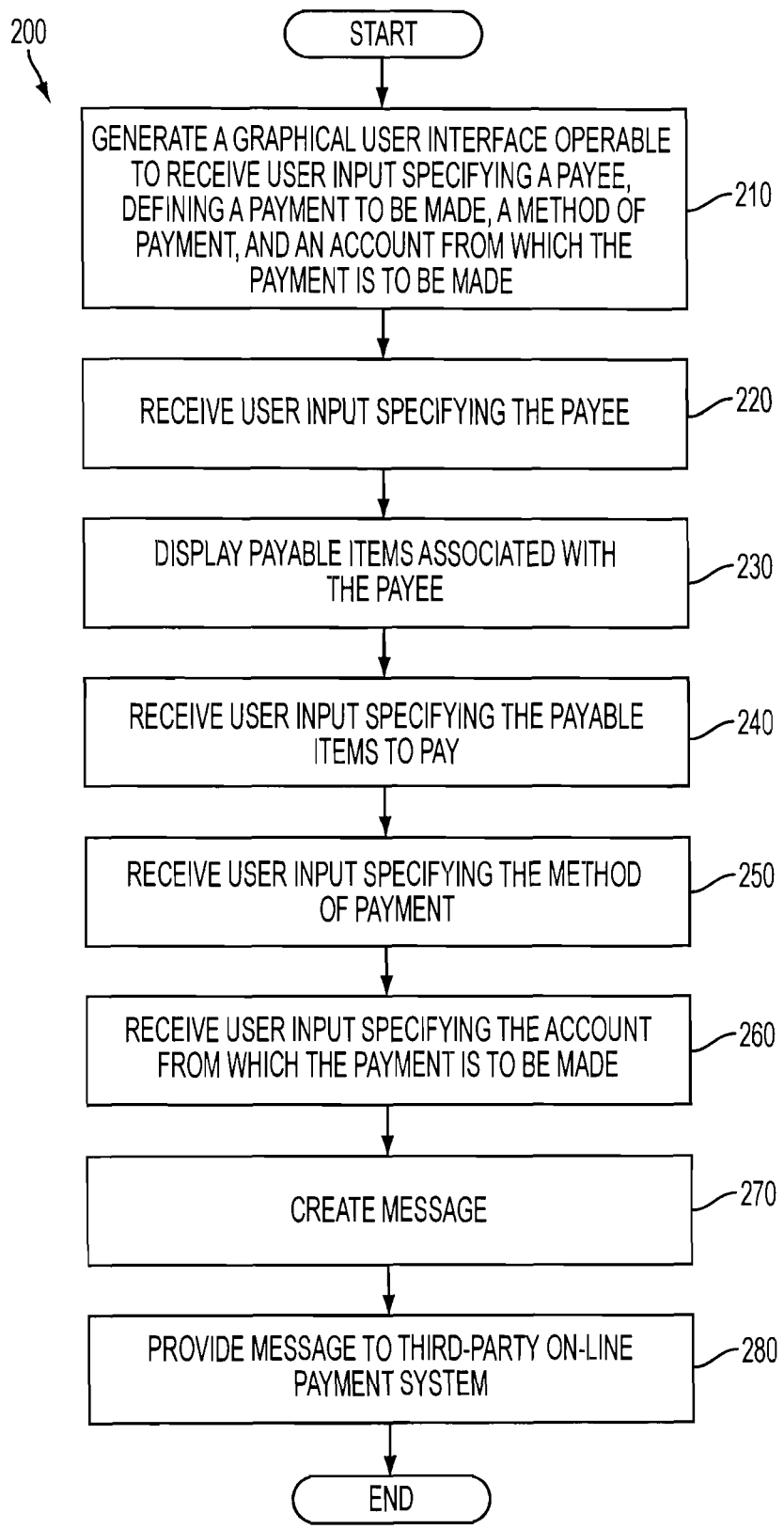
FIG. 2 is a flow chart of a process for making a payment to a payee system.

FIG. 2 depicts an example process 200 for making a payment to a payee system such as the payee system 160 described with respect to FIG. 1. The process 200 may be performed by one or more processors in a system, such as, for example, the financial system 110. The processor is directed by a method, script, or other type of computer program that includes executable instructions for performing the process 200. The process 200 may be manually initiated by, for example, a business analyst or any other user of financial system 110 who wants to make a payment to a payee.

The process 200 begins when a user of the financial system 110 initiates the process 200, and the processor generates a graphical user interface that is operable to receive user input that defines a payment to make to a payee, user input specifying a method of making the payment, and user input that specifies an account from which the payment is to be made (step 210). The process 200 continues when the processor receives user input specifying the payee (step 220). This may be accomplished, for example, by the user selecting a particular payee from a list of all payees to which the payor owes payable items. In another example, the user may enter the name of the payee into a dialog box, or other control, on the graphical user interface.

Once the user has identified the payee, the process 200 continues when the processor causes the graphical user interface to display the payable items owed to the payee (step 230). The graphical user interface also may display information associated with each payable item such as, for example, the amount owed for the payable item, a unique identifier for the payable item (e.g., an invoice number), the due date of the payable item, the status of the payable item, information on the payment terms for the payable item, the default method of payment associated with the payable item, and the currency in which the payable item is to be paid. The graphical user interface also may display the total owed for all of the payable items associated with the payee.

The process 200 continues when the processor receives user input specifying the payable items the user intends to pay (step 240). For example, the user may select to pay one of many payable items owed to the payee, or the user may select to pay some of the payable items. In another example, the user may select to pay all of the payable items owed to the payee. The processor may use the define payment component 124, described above with respect to FIG. 1, to receive user input regarding the payable items to pay and define the payment to be made.

The process 200 continues when the processor receives user input specifying the method of payment by which to pay the payment defined by the user (step 250). For example, the user may specify that the defined payment be made through an Internet-based third-party on-line payment system such as PayPal®, e-gold®, or NetPay®. In another example, the user may indicate that the defined payment be made through a check, credit card, or electronic transfer. In another example, the payee may be associated with a default method of payment, and the user may elect to pay the payee through the default payment method.

Once the user has specified the method of payment, the process 200 continues when the processor receives user input specifying the account from which the payable items is to be paid (step 260). For example, if the user selected to pay the defined payment through PayPal®, the interface may display several PayPal® accounts available to the enterprise such that the user may specify that the payment be made from a particular PayPal® account. In another example, the user may specify that the payment be made through an electronic transfer or a traditional bank draft drawn from a bank or other financial institution.

The example process 200 also includes creating a message (step 270) that the processor is to provide to the payment system specified by the user. The message may include, for example, data that enables the system running process 200 to access an account on a third-party on-line payment system. Thus, the graphical user interface running on the processor may allow the user to access the third-party on-line payment system from within the user interface. The data provided in the message may include, for example, the username and password associated with the account on the third-party on-line payment system, an account identifier, and the network address of the particular third-party on-line payment system. The message also may include data that defines the payment to be made. The message also may include data that identifies the payee and the payee's account, if any, on the third-party on-line payment system.

The process 200 continues when the processor provides the message (created in step 270) to the third-party on-line payment system (step 280) such that the third-party on-line payment system is able to process the defined payment. Additionally, the user interface displayed on the system running process 200 may display the third-party on-line payment system such that the user of the interface may access the functionality of the third-party on-line payment system.

As illustrated by the process 200, a user is able to use the same process to initiate, define, or make payments through a third-party on-line payment system as well as through other payment techniques, such as issuing a bank transfer.

Figure 3:
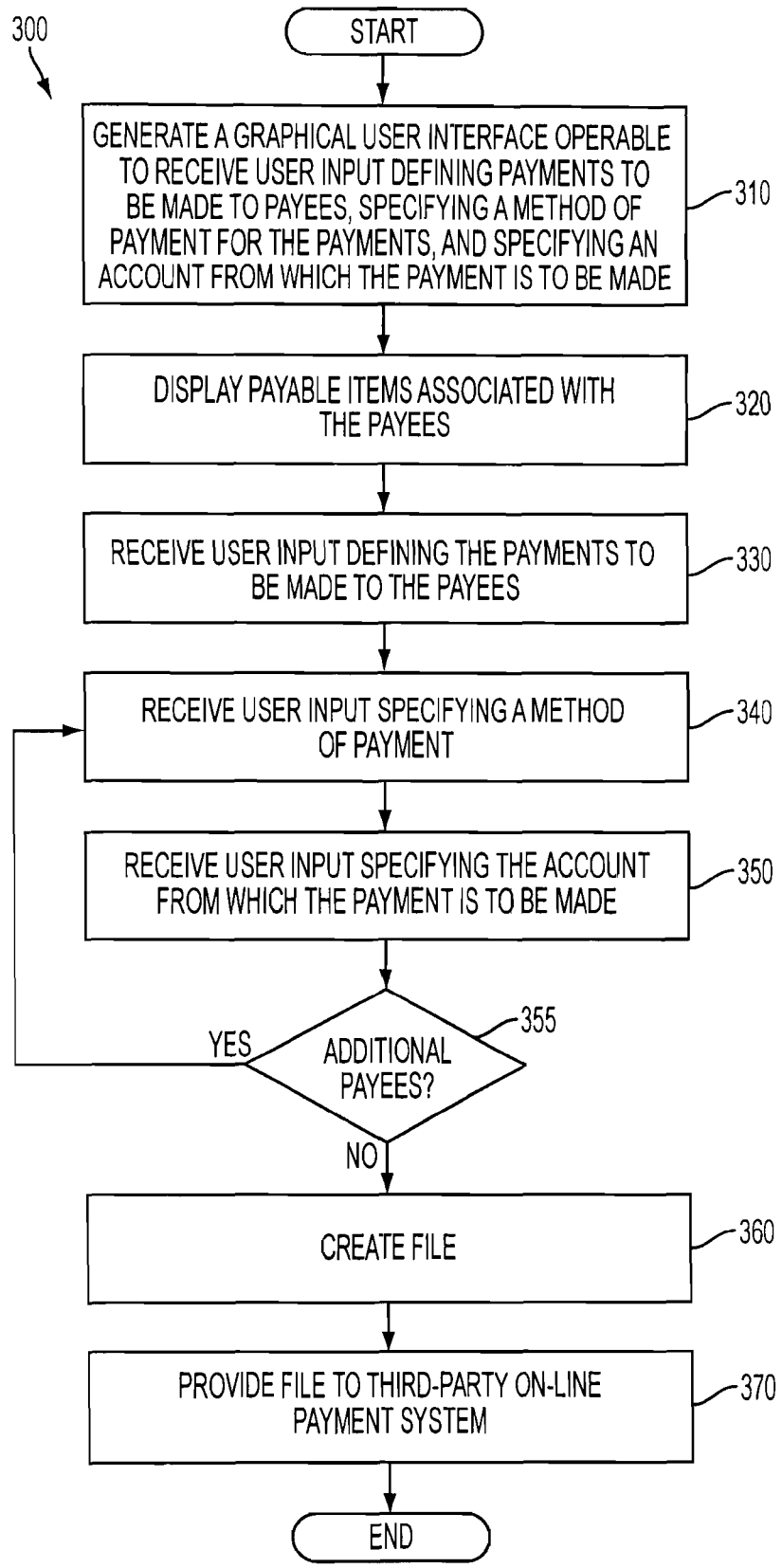
FIG. 3 is a flow chart of a process for making payments to multiple payee systems.

FIG. 3 depicts an example process 300 that allows a user of a system, such as the financial system 110 described with respect to FIG. 1, to make payments to multiple payees using a graphical user interface. Similar to the process 200, the process 300 may be performed by one or more processors in a system, such as, for example, the financial system 110. The processor is directed by a method, script, or other type of computer program that includes executable instructions for performing the process 300. The process 300 may be manually initiated by, for example, a business analyst or any other user of financial system 110 who wants to make a payment to a payee.

The process 300 begins when the processor generates a graphical user interface that is operable to receive user input that defines payments to be made to multiple payees, specifies the method of payment for each defined payment, and specifies the account or accounts from which each payment is to be made (step 310). The processor also causes the graphical user interface to display payable items owed to the payees (step 320). In some implementations, the user has the option of specifying the payees for which to see payable items.

The process 300 continues when the processor receives user input specifying which payable items to pay to each of the payees (step 330). The processor may use, for example, the define payment component 120, described with respect to FIG. 1, to define the payment once the user input specifying the payable items is received. The processor also receives user input specifying the method by which each of the defined payments will be made (step 340). For example, similar to process 200, the user may specify that a defined payment be made through a third-party on-line payment system such as PayPal®, NetPay®, or e-gold®. In another example, the user may specify that a defined payment be made using a check, credit card, bank draft, or electronic transfer. Once the user has specified the method of payment, the processor receives user input specifying an account or accounts from which the defined payments are to be made (step 350). The user may continue to specify a method of payment and an account from which payment is made until all a method of payment and an account are specified for each defined payment (step 355).

The process 300 continues when the processor creates a file summarizing the defined payments, the data describing the account, or accounts, from which the defined payments are to be made, and the data identifying the payees (step 360). In one example, the file may be a Microsoft Excel® file in which the data required to make a payment to a particular payee is included in the Microsoft Excel® file regardless of how many invoices the user selected to pay to that payee. The data required to make a payment to the payee may include, for example, the total amount of the payment, the method of payment, data identifying the account from which to make the payment, and the currency in which the payment will be made. In this example, the Microsoft Excel® file has a similar entry for each payee that is to receive a payment. In another implementation, the data required to make the payments to multiple payees may be contained in an ASCII text file or an XML file, with the ASCII text file or the XML file including substantially the same type of information described above for the Excel® file example.

The process 300 provides the file (created in step 360) to a third-party on-line payment system (step 370). The third-party on-line payment system may be, for example, the third-party on-line payment system 140 described with respect to FIG. 1. Once the third-party on-line payment system 140 receives the file, the contents of the file are imported by the third-party on-line payment system 140 such that the third-party on-line payment system 140 is able to process the defined payments.

Figure 4A:
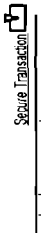

FIG. 4A is an illustration of an example graphical user interface 400A that may be used to define a payment to be made to a payee through a third-party on-line payment system. In one implementation, the graphical user interface 400A may be accessible through a financial system such as the financial system 110 described above in the context of FIG. 1. In the example shown in FIG. 4A, the user has elected to make a payment to one payee ("Johnson & Partner Inc.").

The graphical user interface 400A includes a payable items display 410 that displays the payable items, 412, 413, and 414, that the payor owes to the payee. The payable items display 410 also enables the payor to define the payment to be made to the payee by selecting the payable items to pay. For example, the payor may define the payment by clicking on the payable items to pay using a mouse or other user-input device. In other implementations, the selected payable items may be indicated by an activated checkbox. As shown in the example graphical user interface 400A, the payable items display 410 may include information about each payable item. The payable items display 410 may show a summary of the payable items owed to the payee in a summary section 415. For the example illustration, the summary section 415 displays the total amount owed to the payee for the payable items, 412, 413, and 414. For example, the invoice number, due date, payment terms, payment currency, and amount may be shown for each payable item. The payable items display 410 may indicate that certain payable items have been selected by graying the background of the selected payable items. In the example shown in FIG. 4A, the user of the graphical interface has defined the payment to be made to the payee as payable items 412 and 413.

The graphical user interface 400A also includes a payment system section 420. The payment system section 420 includes a selector 422 that allows the user of the interface 400A to specify the method of payment with which to make the defined payment. In the example shown, the user specified an on-line payment transfer as the method of payment. The on-line payment transfer may be made through an Internet-based payment intermediary such as PayPal®. However, as discussed above in the context of FIG. 1, other methods of payment may be specified such as, for example, an electronic transfer, a credit card, or a traditional bank draft. In some implementations, the method of payment may be predefined for the particular payee, and retrieved by the processor running the interface 400A and then displayed within selector 422. In some implementations, the user may directly specify a method of payment besides the ones shown using selector 422.

The payment system section 420 also includes an account selector 424 that enables the user to specify the account through which to make the payment to the payee. In the example illustration, the user has indicated that payment will be made through the enterprise's Toronto account. The payment system section 420 further includes a total defined payment display 426. The total defined payment display 426 shows the user the total amount of the payment that is to be made to the payee as well as the currency in which the payment is to be made. In the example shown, the total amount of the defined payment is $3,871.57 and the currency is United States dollars.

The graphical user interface 400A also includes a payment transfer details section 430 that enables the user to specify the account information of the payee. The payment transfer details section includes payee contact information 432. Payee contact information 432 displays the contact information, such as the name and electronic mail ("email") address, of the payee. If the payee has an account on the third-party on-line payment system that is being used to process the payment, the contact information may identify the payee's account on the payment system. In general, the payee's contact information is predefined, and the graphical user interface retrieves it and displays it within the payee contact information 432. In some implementations, the contact information 432 may be entered directly by the user of the graphical interface 400A.

The payment transfer details 430 also includes a one-time email checkbox 434 that allows the user to specify the payee's email contact information that identifies the payee's account on the third-party on-line payment system for this transaction only. When the user selects the one-time email checkbox 434, the payee's one-time email address is shown in the one-time email display 436.

The graphical user interface 400 also includes a third-party on-line payment system integration display ("integration display") 440 that enables the user of the interface 400A to use the third-party on-line payment system from within the interface 400A. In the illustration shown in FIG. 4A, PayPal® is the third-party on-line payment system. Using the integration display 440 of the interface 400A is capable of enabling access to other third-party on-line payment systems from within the interface 400A.

The integration display 440 may include a login control 444 that specifies information required for the user of graphical user interface 400 to login to the account on the third-party on-line payment system. The integration display 440 also includes a third-party on-line payment system display 446 ("payment system display"). The payment system display 446 enables the user of the graphical user interface 400 to interact with and use the third-party on-line payment system. In the example shown, the payment system display 446 also includes a summary of the payment to be made such that the user may confirm the payment prior to completing the transaction. The information shown in the payment system display 446 may be imported from a message or file sent from the processor displaying the graphical user interface. The payment system display 446 also includes a payment control 448 that enables the user to finalize the transaction by making the payment to the payee.

Figure 4B:
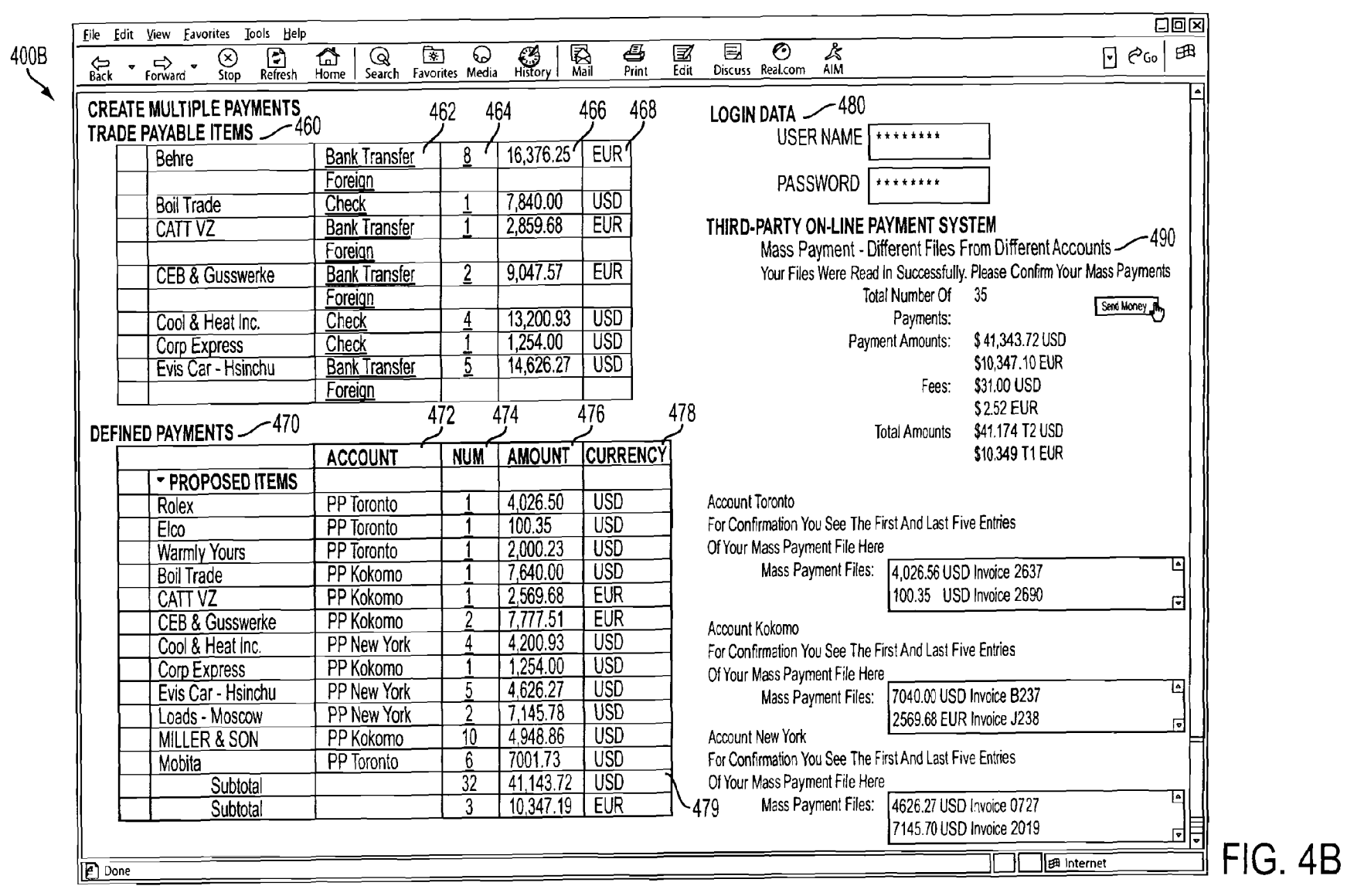

FIG. 4B is an illustration of an example graphical user interface 400B that may be used to define payments to be made to multiple payees through a third-party on-line payment system. The graphical user interface 400B may be running on a financial system such as the financial system 110 described above in the context of FIG. 1.

Graphical user interface 400B also may include a payable items section 460 that allows the user to view items owed to various payees. The user may define a payment by selecting one or more payable items. In the example shown in FIG. 4B, the payable items section 460 displays only some of the payable items that the user may select from to specify the defined payment. The interface 400B also displays information about each payable item summarized by payee. For example, for each payee, the method of payment 462, a number of payable items control 464, the total amount owed 466 for all payable items associated with the payee, and the currency 468 in which the payment to be made are shown within the payable items section 460. In some implementations, the number of payable items control 464 may be a hyperlink such that, by clicking on the number of payable items control 464, the user may view each payable item associated with a particular payee. Once the user clicks on the number of payable items control 464, the user may specify which payable items to pay for that particular payee.

The graphical user interface 400B also includes a defined payments section 470 that displays the defined payments that the user specified as summarized by payee. For each payable item, the user interface 400B displays the account 472 from which the payment will be made, the number of payable items 474 being paid for each payee, the amount 476 of the defined payment for each payee, and the currency 470 in which defined payment will be paid. The defined payments section 470 may also include a summary section 479 that displays the total defined payments summarized by the currency used to make the defined payments.

Similar to the graphical user interface 400A, the graphical user interface 400B also may include a log-in data section 480 that allows the user of the graphical user interface 400B to specify the data required to give the user access to the account, or accounts, from which the defined payments are to be made. The log-in data section 480 may enable the user of the graphical user interface 400B to specify the data required to log into more than one account.

The graphical user interface 400B also may include a third-party on-line payment system display 490 ("payment system display") that enables the user of the interface 400B to use the third-party on-line payment system from within the interface 400B. In the illustration shown in FIG. 4B, PayPal® is the third-party on-line payment system, but, using the integration display 490, the interface 400B is capable of enabling access to other third-party on-line payment systems from within the interface 400B. Additionally, in the illustration shown in FIG. 4B, the third-party on-line payment system has imported the data that the user specified in the payable items section 460 such that the user may view the payments to be made prior to making the payment. This enables the user to confirm that the information about the payments is correct prior to making the payments.

Figure 5:
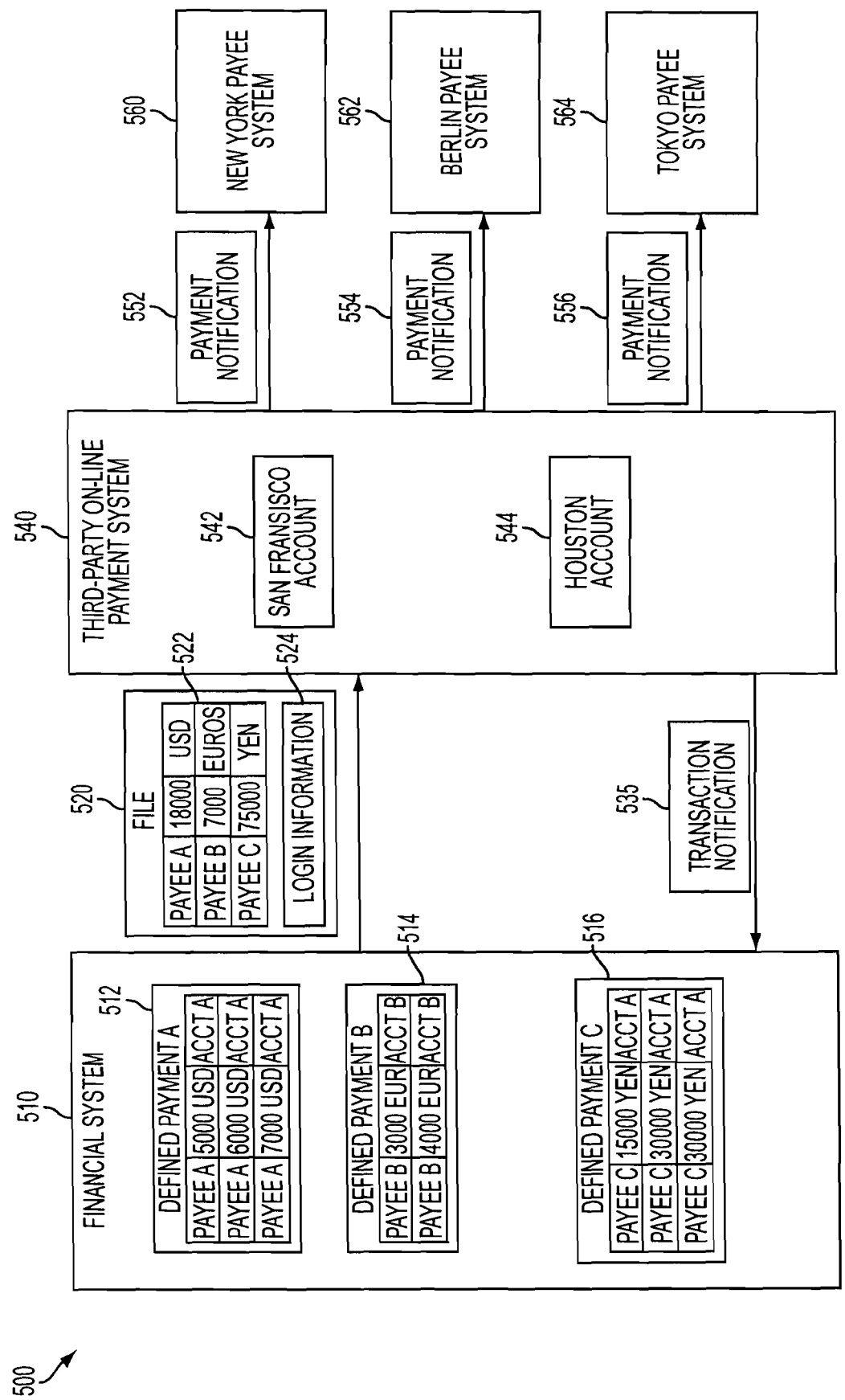
FIG. 5 is an illustration of an example financial transaction.

FIG. 5 shows an example transaction made between an enterprise information technology system 510 having a financial transaction processing component and multiple payee systems, 560, 562, and 564. The transaction is made using a network of computer systems 500, in which a third-party on-line payment system 540 is integrated with the enterprise information system 510. In the example transaction, a user of the financial system 510 defines payments 512, 514, and 516 to be made, respectively, to the New York payee system 560, the Berlin payee system 562, and the Tokyo payee system 564. The user of the financial system 510 may also specify the method of payment for each defined payment and the account from which each defined payment is to be made. Once the user has defined the payments and the method of payment, the financial system 510 provides the third-party on-line payment system 540 with a file 520 that includes, for example, payment data 522 and login information 524.

In the example transaction shown in FIG. 5, the user of the financial system 510 defined a payment 512 to be made to the New York payee system 560, a payment 514 to be made to the Berlin payee system 562, and a payment 516 to be made to the Tokyo payee system 564. The user of financial system 510 may have defined these three payments using executable instructions such as the define payment component 124 described with respect to FIG. 1. In the exemplary transaction shown in FIG. 5, the user specified that the payments to the New York payee system 560 and the Tokyo payee system 564 be made through the San Francisco account 542 on the third-party on-line payment system 540, and the user specified that the payment made to the Berlin payee system 562 be made through the Houston account 544 on the third-party on-line system 540. Each defined payment may include more than one payable item. In the example transaction shown in FIG. 5, the defined payment A 522 includes three payable items. Despite being in different currencies, payable to different payees, and paid from different accounts, the three defined payments 512, 514, and 516, were defined using one interface running on financial system 510.

Once the user of the financial system 510 has defined the payments to be made, the financial system 510 creates a file 520. The file 520 may be created using, for example, the instructions 138 discussed in the context of FIG. 1. The file 520 includes payment definition data 522 and login information 524. The payment definition data 522 includes one line of data for each defined payment. For example, in the transaction 500, the file 520 has a line specifying that total payment to the New York payee system 560 is 18,000 USD, and it is to be made from the San Francisco account 542 on the third-party on-line payment system 540. The login information 524 includes data required to access the accounts 542 and 544 on the third-party on-line payment system 540 such as, for example, the username and password associated with each account and the network address of the third-party on-line payment system 540. In one implementation, file 520 is a Microsoft Excel® file that includes substantially the same information for each defined payment. In another implementation, the file 520 is an ASCII text file that includes substantially the same information for each defined payment.

The financial system 510 sends the file 520 to the third-party on-line payment system 540. The file 520 contains data that enables the user of the financial system 510 to access accounts 542 and 544 on the third-party payment system 540 and information that enables the third-party on-line payment system 540 to process the defined payments. After processing the payments, the third-party on-line payment system 540 sends a transaction notification 535 to the financial system 510. The transaction notification 535 may include information that allows the financial system 510 to track payment information, such as the invoice numbers of the payable items that were paid, the time and date of payment, and an indication of whether the payment was successful.

The third-party on-line payment system 540 also sends payment notifications 552, 554, and 556, respectively, to the New York payee system 560, the Berlin payee system 562, and the Tokyo payee system 564.

Figure 6:
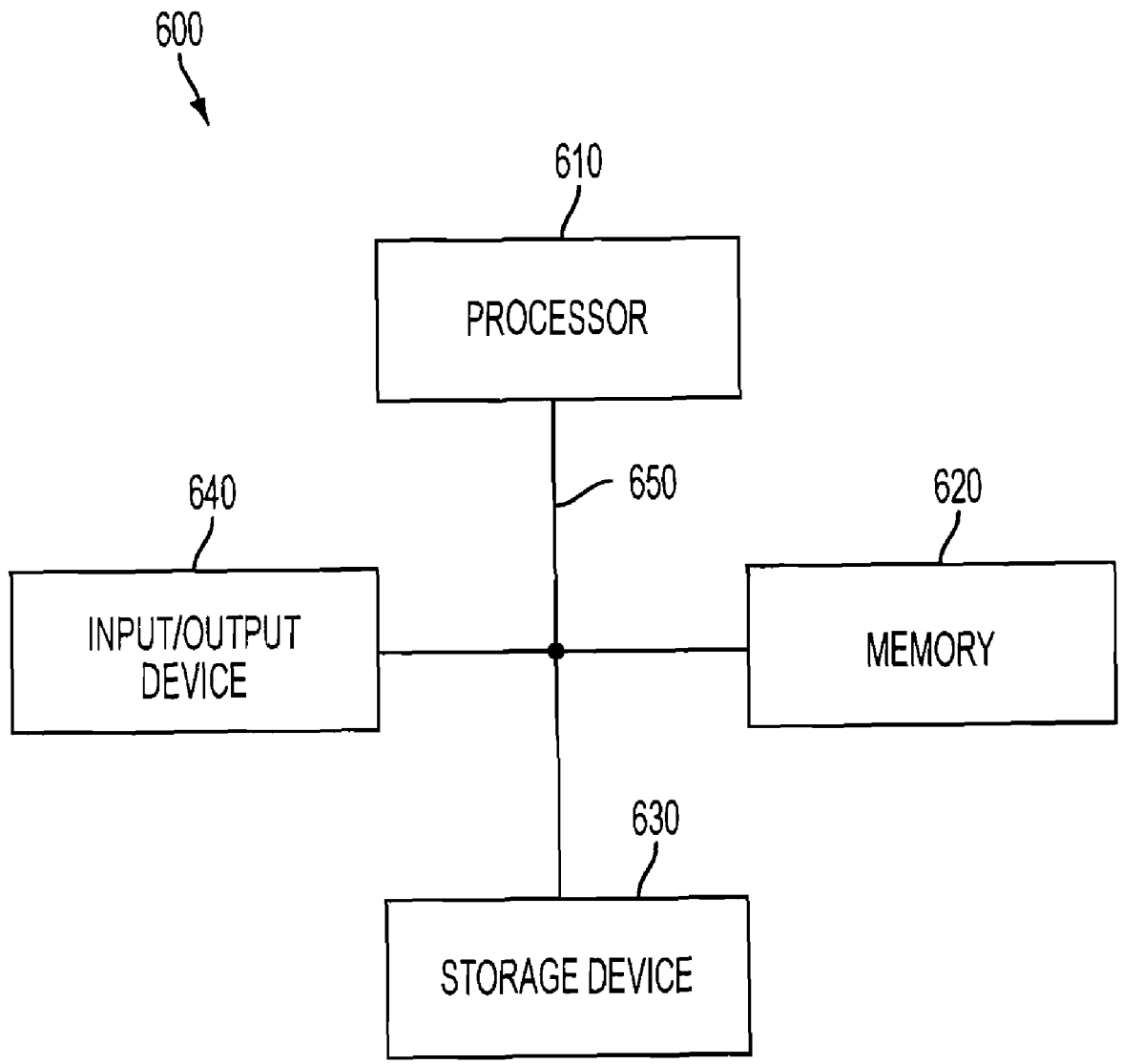
FIG. 6 is a block diagram of a computer system.

FIG. 6 is a block diagram of a computer system 600 that can be used in the operations described above, according to one embodiment. The system 600 includes a processor 610, a memory 620, a storage device 630 and an input/output device 640. Each of the components 610, 620, 630 and 640 are interconnected using a system bus 650. The processor 610 is capable of processing instructions for execution within the system 2000. In some implementations, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In another implementation, the memory 620 is a volatile memory unit. In still another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

For example, the financial system 110, discussed previously with respect to FIG. 1, may include the processor 610 executing computer instructions that are stored in one of memory 620 and storage device 630.

The input/output device 640 provides input/output operations for the system 600. In one implementation, the input/output device 640 includes a keyboard and/or pointing device. In another implementation, the input/output device 640 includes a display unit for displaying graphical user interface as discussed above.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device, in computer-readable storage medium, or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-readable medium having embodied thereon a computer program having a financial component including instructions that, when executed, perform operations comprising:

providing a graphical user interface generated by a financial component, the financial component including a financial data store and a third-party payment system data store wherein:

the financial data store includes information about payable items owed by a particular business entity, the third-party payment system data store includes data about a third-party on-line payment system capable of processing payments made by the particular business entity, the third-party payment system data store is accessible to the financial component and is not accessible by a third-party on-line payment system, the graphical user interface being operable to receive user input specifying payments to be made by the particular business entity, each payment identifying a payee and a payment method to be used to make the payment, and the financial component configured to generate a payment to be made by the particular business entity using a third-party on-line payment system and to generate a payment to be made by the particular business entity using a payment method that does not involve a third-party on-line payment system;

making a determination as to whether any of the specified payments involve a payment method using a third-party on-line payment system that is separate from the financial component; and in response to a determination that a specified payment involves a payment method using a third-party on-line payment system, accessing the third-party payment system data store to retrieve identifying information about a third-party payment system to be used for a specified payment involving a payment method using a third-party on-line payment system that is separate from the financial component, and sending to the third-party on-line payment system, based on the accessed identifying information about the third-party payment system to be used for the specified payment involving, a message including payment information for specified payments to be paid by the third-party on-line payment system such that the third-party on-line payment system is able to process the specified payments based on information in the message and without receiving further direct user input.

2. The computer-readable medium of claim 1 further comprising accessing data representing unpaid invoices associated with the payee.

3. The computer-readable medium of claim 2 further comprising displaying the accessed unpaid invoices within the graphical user interface such that the graphical user interface is operable to receive user input specifying one or more unpaid invoices to pay from among the accessed unpaid invoice data.

4. The computer-readable medium of claim 1 wherein the payment information is sent through a file transfer to the third-party on-line payment system.

5. The computer-readable medium of claim 1 further comprising providing a notification including information associated with processing the payment to the payee.

6. The computer-readable medium of claim 5 further comprising providing a notification to the payee including information associated with processing the payment to the payee.

7. The computer-readable medium of claim 1 further comprising receiving user input indicating confirmation of the specified payments to be made.

8. The computer-readable medium of claim 7 further comprising receiving user input indicating confirmation of payment of some of the invoices associated with the identified payee.

9. The computer-readable medium of claim 1 wherein the specified payments include invoices associated with a payee identified in the specified payments.

10. The computer-readable medium of claim 1 further comprising initiating a graphical user interface associated with the third-party on-line payment system.

11. A computer-implemented method for making payments using a third-party on-line payment system, the method comprising:

providing a graphical user interface generated by a financial component, the financial component including a financial data store and a third-party payment system data store wherein:

the financial data store includes information about payable items owed by a particular business entity, the third-party payment system data store includes data about a third-party on-line payment system capable of processing payments made by the particular business entity, the third-party payment system data store is accessible to the financial component and is not accessible by a third-party on-line payment system, the graphical user interface being operable to receive user input specifying payments to be made by the particular business entity, each payment identifying a payee and a payment method to be used to make the payments, and the financial component configured to generate a payment to be made by the particular business entity using a third-party on-line payment system and to generate a payment to be made by the particular business entity using a payment method that does not involve a third-party on-line payment system;

making a determination as to whether any of the specified payments involve a payment method using a third-party on-line payment system that is separate from the financial component; and in response to a determination that a specified payment involves a payment method using a third-party on-line payment system,
    accessing the third-party payment system data store to retrieve identifying information about a third-party payment system to be used for a specified payment involving a payment method using a third-party on-line payment system that is separate from the financial component, and
    sending to the third-party on-line payment system, based on the accessed identifying information about the third-party payment system to be used for the specified payment involving, a message including payment information for specified payments to be paid by the third-party on-line payment system such that the third-party on-line payment system is able to process the specified payments based on information in the message and without receiving further direct user input.

12. The computer-implemented method of claim 11 further comprising accessing data representing unpaid invoices associated with the payee.

13. The computer-implemented method of claim 12 further comprising displaying the accessed unpaid invoices within the graphical user interface such that the graphical user interface is operable to receive user input specifying one or more unpaid invoices to pay from among the accessed unpaid invoice data.

14. The computer-implemented method of claim 11 wherein the payment information is sent through a file transfer to the third-party on-line payment system.

15. The computer-implemented method of claim 11 further comprising providing a notification including information associated with processing the payment to the payee.

16. The computer-implemented method of claim 15 further comprising providing a notification to the payee including information associated with processing the payment to the payee.

17. The computer-implemented method of claim 11 further comprising receiving user input indicating confirmation of the specified payments to be made.

18. The computer-implemented method of claim 17 further comprising receiving user input indicating confirmation of payment of some of the invoices associated with the identified payee.

19. The computer-implemented method of claim 11 wherein the specified payments include invoices associated with a payee identified in the specified payments.

20. The computer-implemented method of claim 11 further comprising initiating a graphical user interface associated with the third-party on-line payment system.

21. A computer system for enabling a user to define a payment to be paid through a third-party online payment system, the computer system comprising:
  at least one processor;
  a financial component comprising:
    a financial data store including information about payable items, and
    instructions embodied on computer-readable medium that, when executed by the at least one processor, perform operations that enable a user of the financial component to define a payment to be paid through a third-party on-line payment system, the operations including:
      receiving user input to identify the third-party on-line payment system to be used to pay a payable item about which information is included in the financial data store, and
      receiving user input to identify the payable item, the payable item information identifying a payee for payment, the payee being an entity other than the business entity operating the third-party on-line payment system;
  a third-party on-line payment component comprising:
    a third-party payment system store including identifying information about the third-party payment system,
    instructions embodied on computer-readable medium that, when executed by the at least one processor, perform operations enabling a user to identify information about another third-party on-line payment system for storage in the third-party payment system store, and
    instructions embodied on computer-readable medium that, when executed by the at least one processor, creates a message for a third-party on-line payment system by:
      accessing the third-party payment store information to retrieve identifying information about the third-party on-line payment system identified by the user input to identify the third-party on-line payment system,
      accessing the transaction data store to retrieve information about the payable item identified by the user input to identify the payable item, and
      creating a message defining a payment to the payee to be paid through the third-party on-line payment system, the message including information enabling the third-party on-line payment system to pay the payee without receiving further interactive user input;
  instructions embodied on computer-readable medium that, when executed by the at least one processor, make a determination as to whether a payment to be made involves a third-party on-line payment system;
  instructions embodied on computer-readable medium that, when executed by the at least one processor, generate a payment to be made using a payment process that does not involve a third-party on-line payment system; and
  instructions embodied on computer-readable medium that, when executed by the at least one processor, in response to a determination that a payment to be made involves a third-party on-line payment system, send the message to the third-party on-line payment system based on information about the third-party on-line payment system accessed from the third-party payment system store.

\* \* \* \* \*